United States Patent
Ishikawa

(10) Patent No.: US 10,637,564 B2
(45) Date of Patent: Apr. 28, 2020

(54) TRANSMISSION APPARATUS, TRANSMISSION SYSTEM, AND TRANSMISSION METHOD

(71) Applicant: FUJITSU LIMITED, Kawasaki-shi, Kanagawa (JP)

(72) Inventor: Eiji Ishikawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/279,369

(22) Filed: Feb. 19, 2019

(65) Prior Publication Data

US 2019/0273557 A1 Sep. 5, 2019

(30) Foreign Application Priority Data

Mar. 1, 2018 (JP) .................................. 2018-036436

(51) Int. Cl.
   *H04B 10/516* (2013.01)
   *H04B 10/032* (2013.01)
   *H04B 10/27* (2013.01)

(52) U.S. Cl.
   CPC ........... *H04B 10/032* (2013.01); *H04B 10/27* (2013.01); *H04B 10/516* (2013.01); *H04B 10/5161* (2013.01)

(58) Field of Classification Search
   CPC .................... H04B 10/03–038; H04B 10/54
   USPC ......................................................... 398/1–8
   See application file for complete search history.

(56) References Cited

U.S. PATENT DOCUMENTS

| | | | | |
|---|---|---|---|---|
| 5,808,760 A | * | 9/1998 | Gfeller ............... | H04B 10/1143 340/13.24 |
| 7,415,208 B1 | * | 8/2008 | Haggans ............. | H04J 14/0227 14/227 |
| 8,139,485 B2 | * | 3/2012 | Arseneault .......... | H04L 41/5035 370/230.1 |
| 8,909,062 B2 | * | 12/2014 | Yang .................. | H04B 10/2912 359/333 |
| 9,641,257 B2 | * | 5/2017 | Sugihara ............. | G02F 1/0123 |
| 2003/0231887 A1 | * | 12/2003 | Grassi ................ | H04B 10/1127 398/130 |
| 2007/0172000 A1 | | 7/2007 | Hamamoto et al. | |
| 2008/0008469 A1 | * | 1/2008 | Yokoyama ......... | H04B 10/0775 398/16 |
| 2008/0232820 A1 | * | 9/2008 | Burchfiel ............ | H04B 10/505 398/183 |
| 2008/0239448 A1 | * | 10/2008 | Tanaka ................ | G02F 1/2255 359/245 |

(Continued)

FOREIGN PATENT DOCUMENTS

JP          2007-180793         7/2007

*Primary Examiner* — Li Liu
(74) *Attorney, Agent, or Firm* — Fujitsu Patent Center

(57) ABSTRACT

A transmission apparatus includes a memory and a processor coupled to the memory and configured to produce a bit string from a given number of bits of first bit data and second bit data, map the bit string to a symbol corresponding to a data value of the bit string according to a multi-level modulation system and transmit the bit string to a transmission path and acquire the first bit data and the second bit data from a first data signal and a second data signal, respectively, when the transmission path is an active transmission path and acquire the same first bit data and second bit data from the first data signal when the transmission path is a standby transmission path.

12 Claims, 19 Drawing Sheets

(56) References Cited

U.S. PATENT DOCUMENTS

| | | | |
|---|---|---|---|
| 2009/0196602 A1* | 8/2009 | Saunders | H04B 10/5053 398/26 |
| 2009/0245795 A1* | 10/2009 | Joyner | H04B 10/505 398/79 |
| 2009/0285574 A1* | 11/2009 | Liu | H04J 3/14 398/2 |
| 2011/0229149 A1* | 9/2011 | Grubb | H04B 10/506 398/188 |
| 2011/0255876 A1* | 10/2011 | Sugihara | H04B 10/5053 398/188 |
| 2012/0224851 A1* | 9/2012 | Takara | H04B 10/0793 398/45 |
| 2013/0051809 A1* | 2/2013 | Mehrvar | H04B 10/032 398/208 |
| 2013/0121683 A1* | 5/2013 | Nagamine | H04L 41/0677 398/2 |
| 2015/0043904 A1* | 2/2015 | Boduch | H04B 10/032 398/2 |
| 2015/0071656 A1* | 3/2015 | Oyama | H04B 10/58 398/194 |
| 2015/0280854 A1* | 10/2015 | Matsukawa | H04J 14/022 398/3 |
| 2015/0349894 A1* | 12/2015 | Renaudier | H04B 10/5161 398/183 |
| 2017/0019167 A1* | 1/2017 | Shoji | H04B 10/032 |
| 2017/0250757 A1* | 8/2017 | Hatae | H04B 10/5161 |
| 2017/0250759 A1* | 8/2017 | Hatae | H04B 10/548 |
| 2018/0041285 A1* | 2/2018 | Irie | H04B 10/516 |
| 2019/0081845 A1* | 3/2019 | Rafique | H04L 1/007 |

* cited by examiner

FIG. 6

| UPPER SIDE Da | LOWER SIDE Db | Ds |
|---|---|---|
| 00 | 00 | 0000 |
| 00 | 01 | 0001 |
| 00 | 10 | 0010 |
| 00 | 11 | 0011 |
| 01 | 00 | 0100 |
| 01 | 01 | 0101 |
| 01 | 10 | 0110 |
| 01 | 11 | 0111 |
| 10 | 00 | 1000 |
| 10 | 01 | 1001 |
| 10 | 10 | 1010 |
| 10 | 11 | 1011 |
| 11 | 00 | 1100 |
| 11 | 01 | 1101 |
| 11 | 10 | 1110 |
| 11 | 11 | 1111 |

FIG. 7

| 1010 | 1000 | 0010 | 0000 |
|------|------|------|------|
| 1011 | 1001 | 0011 | 0001 |
| 1110 | 1100 | 0110 | 0100 |
| 1111 | 1101 | 0111 | 0101 |

FIG. 9

| UPPER SIDE | LOWER SIDE | Ds |
|---|---|---|
| Da | Db | |
| 00 | 00 | 0000 |
| 01 | 01 | 0101 |
| 10 | 10 | 1010 |
| 11 | 11 | 1111 |

FIG. 12

| UPPER SIDE | - | LOWER SIDE | Ds |
|---|---|---|---|
| Da | Db | Dc | |
| 00 | 00 | 00,01,10,11 | 000000~000011 |
|    | 01 | 00,01,10,11 | 000100~000111 |
|    | 10 | 00,01,10,11 | 001000~001011 |
|    | 11 | 00,01,10,11 | 001100~001111 |
| 01 | 00 | 00,01,10,11 | 010000~010011 |
|    | 01 | 00,01,10,11 | 010100~010111 |
|    | 10 | 00,01,10,11 | 011000~011011 |
|    | 11 | 00,01,10,11 | 011100~011111 |
| 10 | 00 | 00,01,10,11 | 100000~100011 |
|    | 01 | 00,01,10,11 | 100100~100111 |
|    | 10 | 00,01,10,11 | 101000~101011 |
|    | 11 | 00,01,10,11 | 101100~101111 |
| 11 | 00 | 00,01,10,11 | 110000~110011 |
|    | 01 | 00,01,10,11 | 110100~110111 |
|    | 10 | 00,01,10,11 | 111000~111011 |
|    | 11 | 00,01,10,11 | 111100~111111 |

FIG. 13

| 101010 | 100010 | 101000 | 100000 | 001010 | 000010 | 001000 | 000000 |
| --- | --- | --- | --- | --- | --- | --- | --- |
| 101110 | 100110 | 101100 | 100100 | 001110 | 000110 | 001100 | 000100 |
| 101011 | 100011 | 101001 | 100001 | 001011 | 000011 | 001001 | 000001 |
| 101111 | 100111 | 101101 | 100101 | 001111 | 000111 | 001101 | 000101 |
| 111010 | 110010 | 111000 | 110000 | 011010 | 010010 | 011000 | 010000 |
| 111110 | 110110 | 111100 | 110100 | 011110 | 010110 | 011100 | 010100 |
| 111011 | 110011 | 111001 | 110001 | 011011 | 010011 | 011001 | 010001 |
| 111111 | 110111 | 111101 | 110101 | 011111 | 010111 | 011101 | 010101 |

FIG. 15

| UPPER SIDE | - | LOWER SIDE | Ds |
|---|---|---|---|
| Da | Db | Dc | |
| 00 | 00 | 00 | 000000 |
| 01 | 01 | 01 | 010101 |
| 10 | 10 | 10 | 101010 |
| 11 | 11 | 11 | 111111 |

FIG. 18

| UPPER SIDE | - | LOWER SIDE | Ds |
|---|---|---|---|
| Da | Db | Dc | |
| 00 | 00 | 00 | 000000 |
| | | 01 | 000001 |
| | | 10 | 000010 |
| | | 11 | 000011 |
| 01 | 01 | 00 | 010100 |
| | | 01 | 010101 |
| | | 10 | 010110 |
| | | 11 | 010111 |
| 10 | 10 | 00 | 101000 |
| | | 01 | 101001 |
| | | 10 | 101010 |
| | | 11 | 101011 |
| 11 | 11 | 00 | 111100 |
| | | 01 | 111101 |
| | | 10 | 111110 |
| | | 11 | 111111 |

FIG. 19

|  |  |  |  |  |  |
|---|---|---|---|---|---|
| • 101010 | • 101000 |  | • 000010 | • 000000 |  |
| • 101011 | • 101001 |  | • 000011 | • 000001 |  |
|  |  |  |  |  |  |
| • 111110 | • 111100 |  | • 010110 | • 010100 |  |
| • 111111 | • 111101 |  | • 010111 | • 010101 |  |

TRANSMISSION APPARATUS, TRANSMISSION SYSTEM, AND TRANSMISSION METHOD

CROSS-REFERENCE TO RELATED APPLICATION

This application is based upon and claims the benefit of priority of the prior Japanese Patent Application No. 2018-36436, filed on Mar. 1, 2018, the entire contents of which are incorporated herein by reference.

FIELD

The embodiment discussed herein is related to a transmission apparatus, a transmission system, and a transmission method.

BACKGROUND

To construct disaster-resistant optical path protection in an optical network, it is desirable to install a standby transmission path sufficiently away from an active transmission path so that faults do not occur in any of the active and standby transmission paths due to the same cause. A multi-level modulation system, such as 16-quadrature amplitude modulation (QAM) and 32-QAM, is used as a modulation system of an optical signal in recent years to expand the transmission capacity. The higher the degree of multi-level in the multi-level modulation system, the higher the transmission capacity. However, the transmittable distance is reduced. An example of related art is disclosed in Japanese Laid-open Patent Publication No. 2007-180793.

When the standby transmission path is installed away from the active transmission path, the standby transmission path becomes longer than the active transmission path, and there is a problem that it is difficult to reserve an optical signal to noise ratio (OSNR) for maintaining sufficient transmission quality in the standby transmission path. For example, the higher the degree of multi-level in the multi-level modulation system, the higher the desirable OSNR for maintaining sufficient transmission quality. However, the OSNR is reduced when the distance of the standby transmission path is extended.

In this regard, the OSNR for maintaining sufficient transmission quality may be reserved if the degree of multi-level in the multi-level modulation system is reduced when the active transmission path is switched to the standby transmission path. However, the process of changing the degree of multi-level takes a long time (several seconds to several tens of seconds, for example) due to, for example, the change in the setting of digital signal processor (DSP), and it is difficult to switch the transmission path within a desirable time (within 50 milliseconds, for example).

In view of the foregoing, it is desirable to provide a transmission apparatus, a transmission system, and a transmission method that may reduce the time required to switch the transmission path.

SUMMARY

According to an aspect of the embodiment, a transmission apparatus includes a memory and a processor coupled to the memory and configured to produce a bit string from a given number of bits of first bit data and second bit data, map the bit string to a symbol corresponding to a data value of the bit string according to a multi-level modulation system and transmit the bit string to a transmission path and acquire the first bit data and the second bit data from a first data signal and a second data signal, respectively, when the transmission path is an active transmission path and acquire the same first bit data and second bit data from the first data signal when the transmission path is a standby transmission path.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 depicts an example of data values of a bit string produced from bit data;

FIG. 7 depicts an example of a 16-QAM constellation in which symbols are not degenerated;

FIG. 9 depicts an example of data values of a bit string produced from a same bit data;

FIG. 12 depicts an example of data values of a bit string produced from bit data;

FIG. 13 depicts an example of a 64-QAM constellation when symbols are not degenerated;

FIG. 15 depicts another example of data values of a bit string produced from a same bit data;

FIG. 18 depicts an example of data values of a bit string produced from a same bit data acquired from one data signal and bit data acquired from another data signal; and FIG. 19 depicts another example of a 64-QAM constellation in which symbols are degenerated.

DESCRIPTION OF EMBODIMENT

Figure 1:
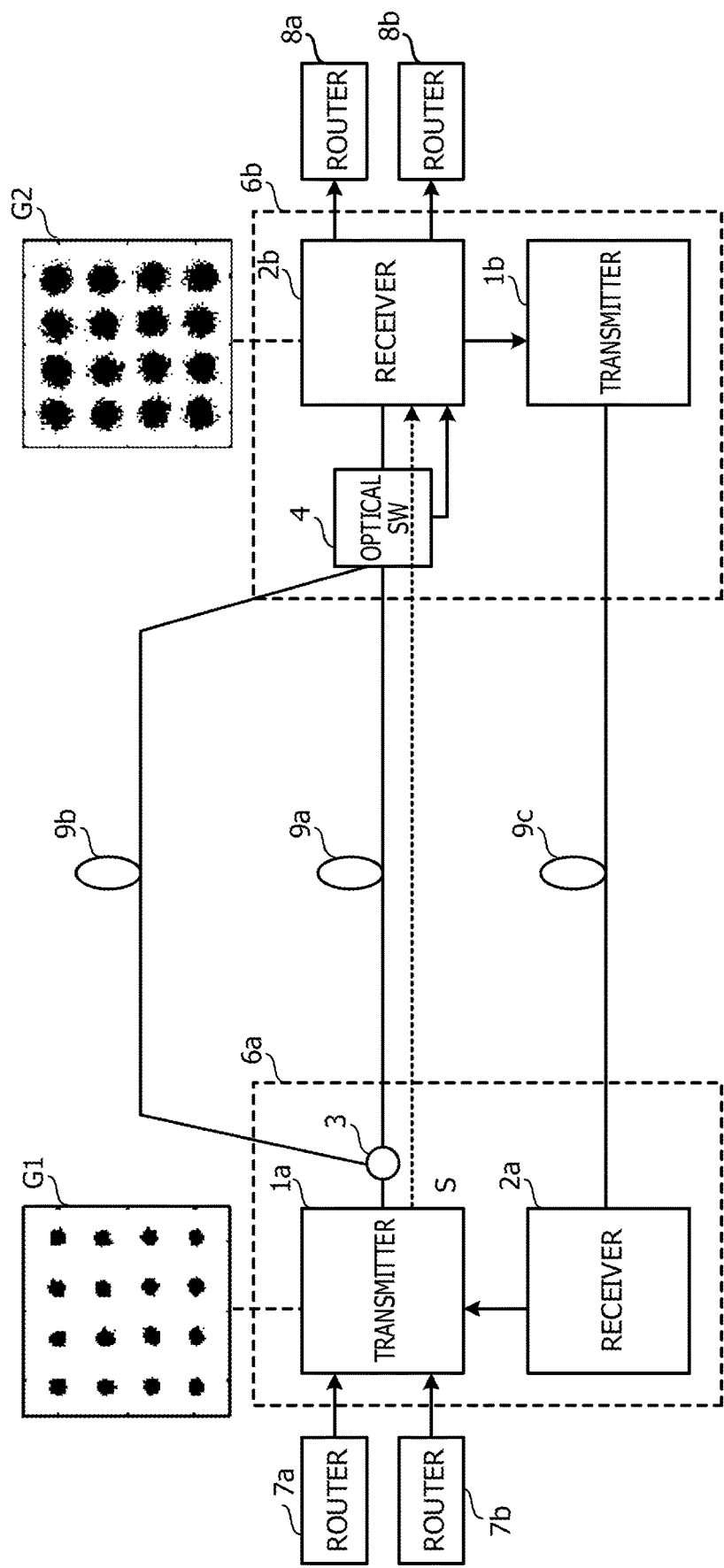
FIG. 1 is a block diagram illustrating an example of a transmission system when an optical signal is transmitted to an active transmission path.

FIG. 1 is a block diagram illustrating an example of a transmission system when an optical signal is transmitted to an active transmission path. The transmission system includes a transmitting-side transmission apparatus 6a and a receiving-side transmission apparatus 6b. The transmitting-side transmission apparatus 6a includes a transmitter 1a and a receiver 2a, and the receiving-side transmission apparatus 6b includes a transmitter 1b and a receiver 2b.

The transmitter 1a is coupled to the receiver 2b of the receiving-side transmission apparatus 6b through the active transmission path 9a and a standby transmission path 9b, such as optical fibers. The active transmission path 9a and the standby transmission path 9b are installed at a sufficient distance from each other so that faults do not occur due to the same cause. For example, the standby transmission path 9b is provided to make a detour around the active transmission path 9a, and the standby transmission path 9b is longer than the active transmission path 9a.

The transmitter 1a is coupled to the active transmission path 9a and the standby transmission path 9b through an optical splitter 3 provided on the transmitting-side transmission apparatus 6a. Therefore, the optical signal S output from the transmitter 1a is input to the active transmission path 9a and the standby transmission path 9b.

The receiver 2b is coupled to the active transmission path 9a and the standby transmission path 9b through an optical switch (optical SW) 4 provided on the receiving-side transmission apparatus 6b. The optical switch 4 selects one of the active transmission path 9a and the standby transmission path 9b according to the states of the active transmission path 9a and the standby transmission path 9b. For example, the optical switch 4 selects the standby transmission path 9b when a fault (blocking of transmission path, for example) is detected in the active transmission path 9a and selects the active transmission path 9a when repair of the fault is detected. Therefore, the optical switch 4 switches the transmission paths 9a and 9b to be used for the transmission according to the states of the transmission paths 9a and 9b.

In the example, the optical switch 4 selects the active transmission path 9a, and the receiver 2b receives the optical signal S from the transmitter 1a through the active transmission path 9a as indicated by a dotted line. The transmitter 1b and the receiver 2a are coupled through an active transmission path 9c, and the transmitter 1b and the receiver 2a transmit and receive the optical signal S in a similar manner to the other transmitter 1a and the receiver 2b. However, an example of a transmission process from the transmitter 1a to the receiver 2b will be described below, and the standby transmission path between the transmitter 1b and the receiver 2a will not be described. The transmitting-side transmission apparatus 6a is an example of a first transmission apparatus, and the receiving-side transmission apparatus 6b is an example of a second transmission apparatus.

Routers 7a and 7b are coupled to a client interface of the transmitter 1a, and routers 8a and 8b are coupled to a client interface of the receiver 2b. The transmitter 1a combines and modulates data signals received from the respective routers 7a and 7b to generate the optical signal S. The receiver 2b separates each data signal from the optical signal S and transmits the data signals to the routers 8a and 8b.

As a result, the data signal is transmitted from the router 7a to the router 8a, and the data signal is transmitted from the router 7b to the router 8b. An example of the data signal includes an Ethernet (registered trademark, the same applies hereinafter) signal, but the data signal is not limited to this.

The transmitter 1a uses, for example, 16-QAM as a multi-level modulation system. Reference sign G1 denotes an example of signal points of the optical signal S in a 16-QAM constellation in the transmitter 1a. The signal points are distributed at sufficient distances according to symbols corresponding to the phase and the amplitude of the optical signal S.

Reference sign G2 denotes an example of signal points of the optical signal S in the 16-QAM constellation in the receiver 2b. The distances between the signal points corresponding to the symbols are narrower than the distances between the signal points (reference sign G1) on the transmitter 1a side due to amplified spontaneous emission (ASE) or nonlinear optical effect (self-phase modulation, for example) caused by in-line amplifiers in the transmission path 9a. However, sufficient distances for identifying the signal points corresponding to the symbols are maintained. Therefore, it may be stated that regarding the transmission performance, the transmitter 1a and the receiver 2b have OSNR desirable for maintaining sufficient transmission quality in the active transmission path 9a.

Figure 2:
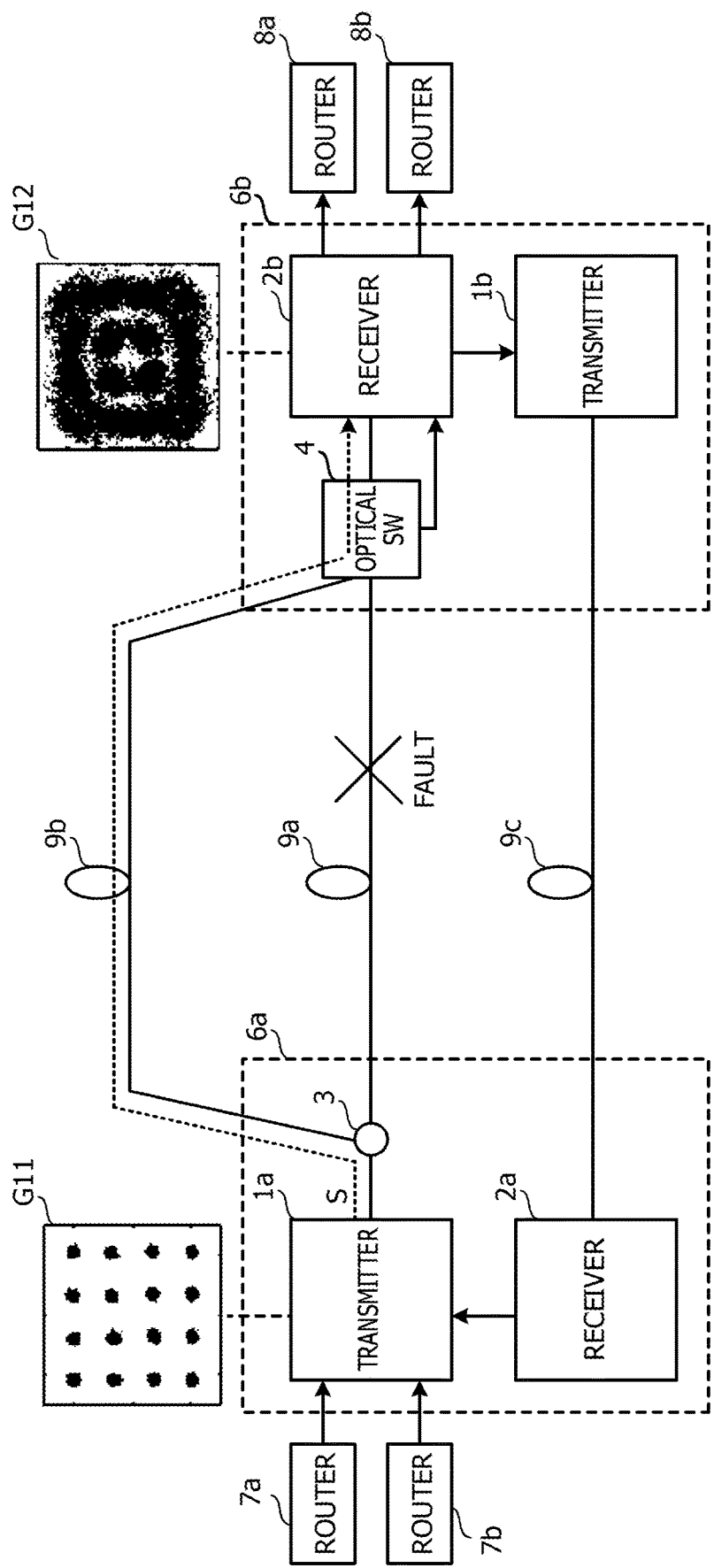
FIG. 2 is a block diagram illustrating an example of a transmission system in a comparative example when an optical signal is transmitted to a standby transmission path.

FIG. 2 is a block diagram illustrating an example of the transmission system in a comparative example when the optical signal S is transmitted to the standby transmission path 9b. In FIG. 2, the same reference signs are provided to the components common to FIG. 1, and the description will not be repeated.

In the example, there is a fault in the active transmission path 9a (see × mark), and the optical switch 4 selects the standby transmission path 9b. Therefore, the receiver 2b receives the optical signal S from the transmitter 1a through the standby transmission path 9b as indicated by a dotted line.

Reference sign G11 denotes an example of signal points of the optical signal S in the 16-QAM constellation in the transmitter 1a. The signal points of reference sign G11 are similar to the signal points of reference sign G1.

Reference sign G12 denotes an example of signal points of the optical signal S in the 16-QAM constellation in the receiver 2b. The standby transmission path 9b is longer than the active transmission path 9a, and the number of in-line amplifiers in the standby transmission path 9b is larger than that of the active transmission path 9a. The standby transmission path 9b is significantly affected by the ASE and is also significantly affected by the nonlinear optical effect.

Therefore, the distances between the signal points corresponding to the symbols are smaller than in the case of the transmission through the active transmission path 9a (reference sign G2) so that identifying the signal points corresponding to the symbols is difficult. Thus, it may be stated that regarding the transmission performance, the transmitter 1a and the receiver 2b do not have the OSNR desirable for maintaining sufficient transmission quality in the standby transmission path 9b.

In this way, when the active transmission path 9a is switched to the standby transmission path 9b while the 16-QAM is maintained for the multi-level modulation system (degree of multi-level is maintained, for example), the transmission distance is extended in the transmitter 1a and the receiver 2b. As a result, the OSNR is reduced, and the transmission quality is reduced.

On the other hand, if the degree of multi-level is reduced when the active transmission path 9a is switched to the standby transmission path 9b, the OSNR desirable for maintaining sufficient transmission quality may be reserved. However, the process of changing the degree of multi-level takes a long time (several seconds to several tens of seconds, for example) due to, for example, the change in the setting of DSP, and it is difficult to switch the transmission path within a required time (within 50 milliseconds, for example).

Therefore, when the active transmission path 9a is switched to the standby transmission path 9b, the transmitter 1a in the embodiment extends the distances between the signal points corresponding to the symbols by limiting the types of symbols used in the constellation while maintaining the 16-QAM for the multi-level modulation system. This allows the receiver 2b to identify the signal point corresponding to each symbol.

Therefore, the transmitter 1a and the receiver 2b may improve the OSNR as compared to the comparative example without reducing the degree of multi-level, and the time required to switch the transmission path may be reduced. The process of limiting the types of symbols used in the constellation in the transmitter 1a will be referred to as "degeneration" of symbols in the following description.

Figure 3:
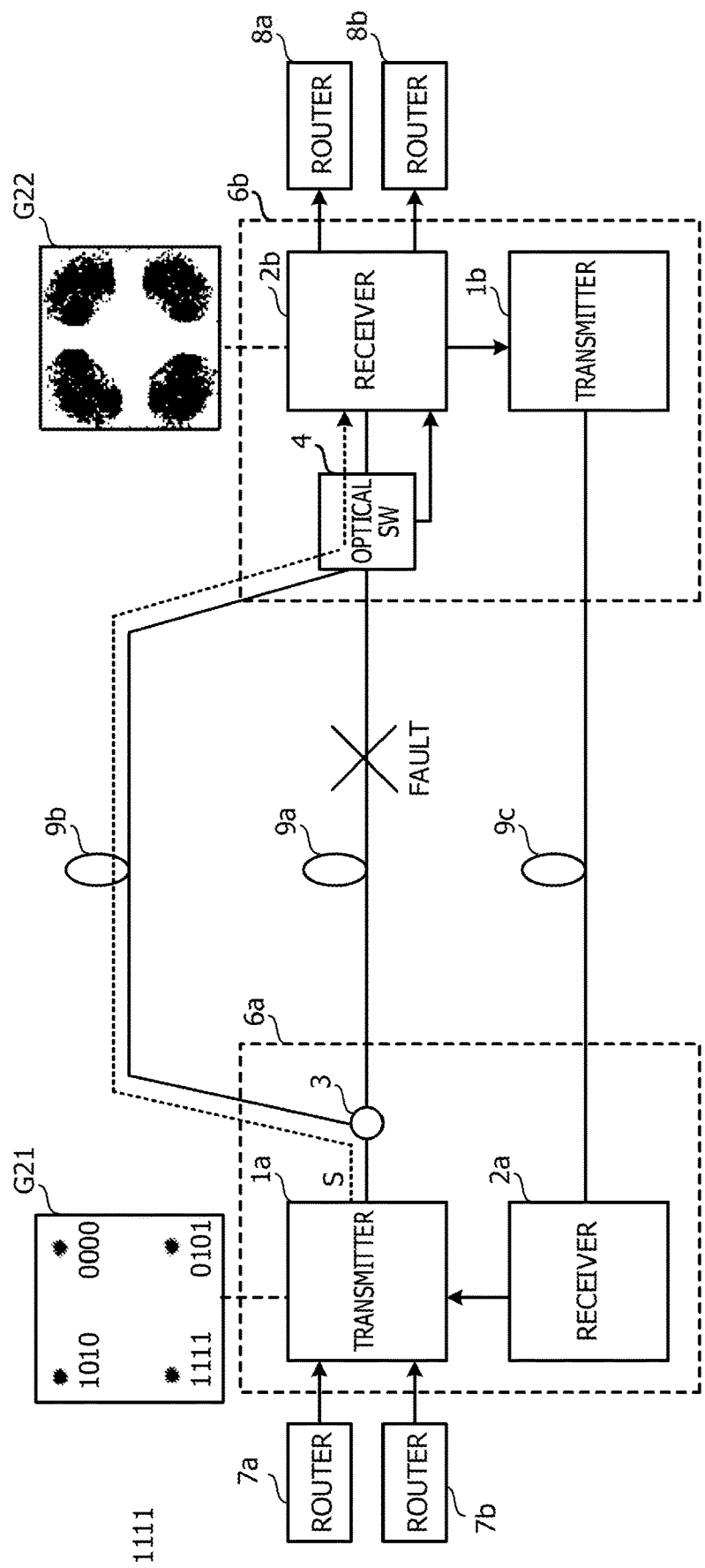
FIG. 3 is a block diagram illustrating an example of a transmission system in an embodiment when an optical signal is transmitted to a standby transmission path.

FIG. 3 is a block diagram illustrating an example of the transmission system in the embodiment when the optical signal S is transmitted to the standby transmission path 9b. In FIG. 3, the same reference signs are provided to the components common to FIG. 2, and the description will not be repeated.

The transmitter 1a generates the optical signal S by using the 16-QAM to modulate only the data signal of one router 7a (or router 7b) of the data signals input from the routers 7a and 7b. In this case, the transmitter 1a replicates the data signal of one router 7a to generate bit strings "0000," "0101," "1010," and "1111" including consecutive pieces of the same bit data of 2 bits and maps the bit strings to the symbols corresponding to the bit strings.

Reference sign G21 illustrates an example of signal points of the optical signal S in the 16-QAM constellation in the transmitter 1a. The transmitter 1a uses the method described above to degenerate the symbols from 16 types to four types. The four symbols after the degeneration correspond to the respective bit strings "0000," "0101," "1010," and "1111." The four symbols are positioned at corners of the area surrounding the symbols before the degeneration (see reference sign G1 in FIG. 1), and the distances between the symbols are maximum.

Reference sign G22 illustrates an example of signal points of the optical signal S in the 16-QAM constellation in the receiver 2b. The distances between the symbols are maximized by the degeneration, and even if the signal points corresponding to the symbols vary widely due to the length of the standby transmission path 9b, distances sufficient for the receiver 2b to identify the signal point corresponding to each symbol are reserved between distribution areas of the signal points. The receiver 2b identifies the signal points to execute the demodulation process to restore the data signal and transmits the data signal to the router 8a. The receiver 2b transmits, to the other router 8b, a notification (link fault (LF) signal, for example) indicating that the data signal is stopped.

Therefore, the transmitter 1a and the receiver 2b may improve the OSNR without reducing the degree of multi-level while maintaining the 16-QAM. Thus, the transmitter 1a and the receiver 2b do not have to spend time to change the degree of multi-level, and the time required to switch the transmission path may be reduced.

The transmitter 1a starts the degeneration process of the symbols in response to reception of fault information for notifying occurrence of a fault. The receiver 2b generates the fault information when the receiver 2b detects occurrence of a fault in the active transmission path 9a. The receiver 2b transmits the fault information to the transmitter 1a through, for example, the other transmitter 1b and receiver 2a. The receiver 2b may receive switch information indicating the switch of transmission path from the optical switch 4 and may notify the router 8b of the stop of the data signal in response to the reception.

Figure 4:
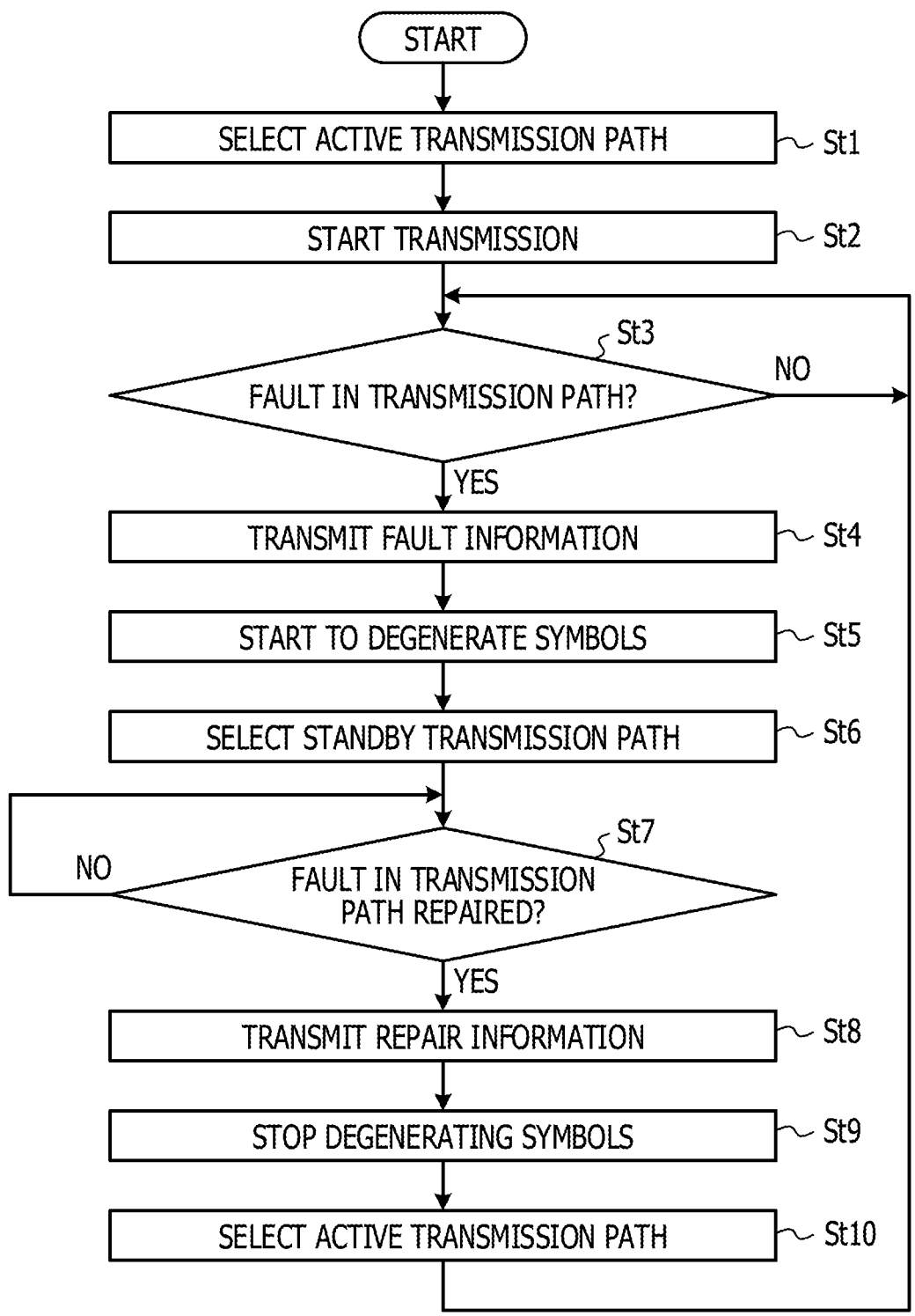
FIG. 4 is a flow chart illustrating an example of an operation of a transmission system.

FIG. 4 is a flow chart illustrating an example of an operation of the transmission system. The optical switch 4 selects the active transmission path 9a (step St1). The transmitter 1a and the receiver 2b start to transmit the optical signal S (step St2).

The receiver 2b determines whether there is a fault in the active transmission path 9a (step St3). When there is no fault (No in step St3), the receiver 2b executes the process of step St3 again.

When there is a fault (Yes in step St3), the receiver 2b notifies the transmitter 1a of the fault information for notifying the fault through the other transmitter 1b and receiver 2a (step St4). The transmitter 1a starts to degenerate the symbols in response to the reception of the fault information (step St5). The optical switch 4 selects the standby transmission path 9b (step St6).

The receiver 2b determines whether the fault in the active transmission path 9a is repaired (step St7). When the fault is not repaired (No in step St7), the receiver 2b executes the process of step St7 again.

When the fault is repaired (Yes in step St7), the receiver 2b transmits repair information for notifying the repair of the fault to the transmitter 1a through the other transmitter 1b and receiver 2a (step St8). The transmitter 1a stops degenerating the symbols in response to the reception of the repair information (step St9). The optical switch 4 selects the active transmission path 9a (step St10). The transmission system operates in this way.

Next, the configurations of a transmitter and a receiver will be described. The transmission method of the embodiment is realized by the operation of a transmitter and a receiver described below.

Figure 5:
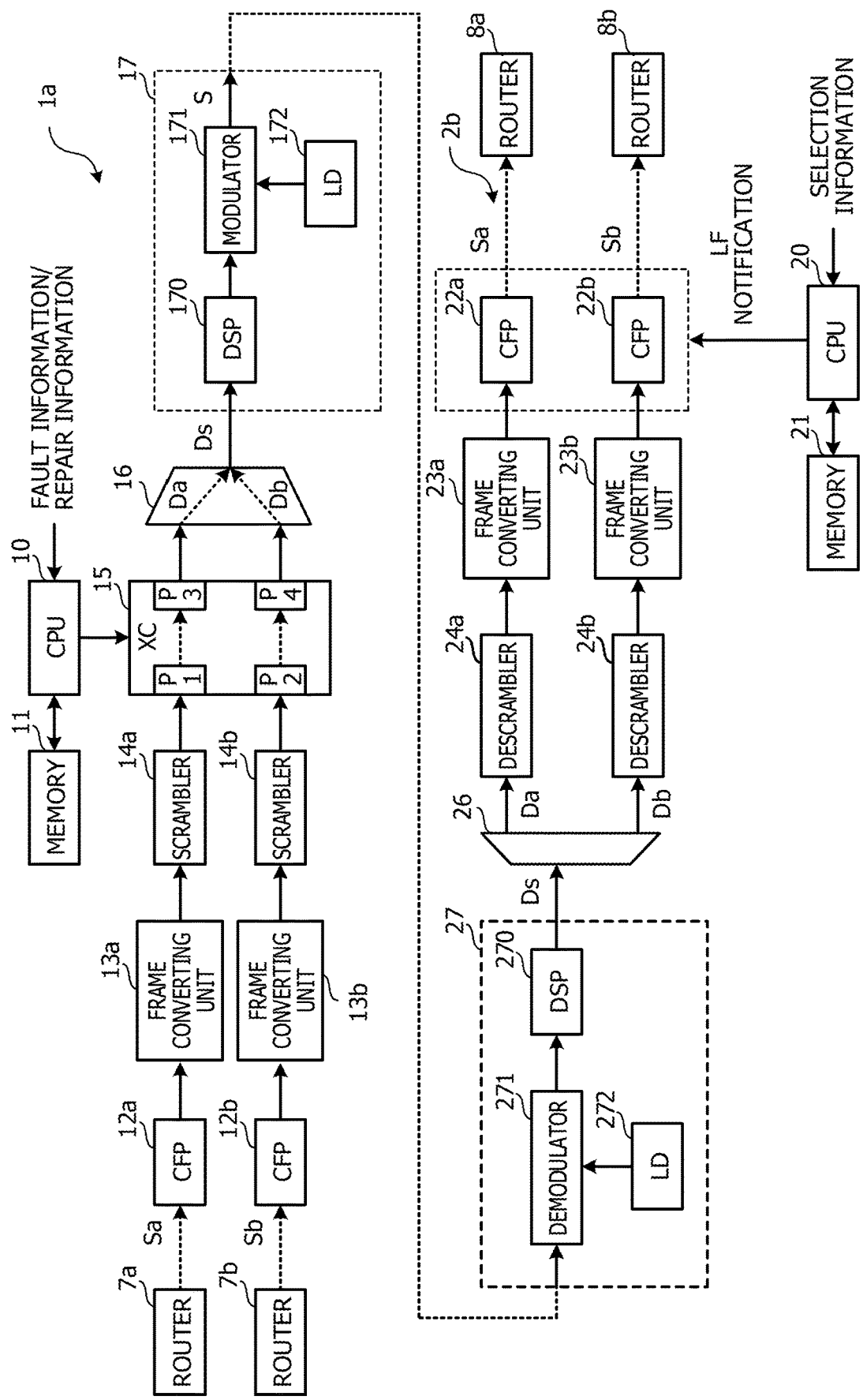
FIG. 5 is a block diagram illustrating an example of a transmitter and a receiver when a degeneration process of symbols is stopped.

FIG. 5 is a block diagram illustrating an example of a transmitter and a receiver when a degeneration process of symbols is stopped. The transmitter and the receiver depicted in FIG. 5 may be the transmitter 1a and the receiver 2b depicted in FIG. 1. The transmitter 1a includes a central processing unit (CPU) 10, a memory 11, C form-factor pluggables (CFPs) 12a and 12b, frame converting units 13a and 13b, scramblers 14a and 14b, a cross-connect unit (XC) 15, a multiplexer 16, and a transmitting unit 17.

The CFPs 12a and 12b are optical modules that transmit and receive light, and the CFPs 12a and 12b are coupled to the routers 7a and 7b, respectively, through optical fibers. The CFP 12a receives an optical data signal Sa from the router 7a, converts the optical data signal Sa into an electrical data signal Sa, and outputs the electrical data signal Sa to the frame converting unit 13a. The CFP 12b receives an optical data signal Sb from the router 7b, converts the optical data signal Sb into an electrical data signal Sb, and outputs the electrical data signal Sb to the frame converting unit 13b. The data signal Sa is an example of a first data signal, and the data signal Sb is an example of a second data signal.

The frame converting units 13a and 13b convert the frame format of the data signals Sa and Sb input from the CFPs 12a and 12b from an Ethernet frame to "optical transport unit (OTU) k/Cn." The "OTUk/Cn" is defined in International Telecommunication Union Telecommunication Standardization Sector (ITU-T) Recommendation G.709. The frame converting units 13a and 13b output the data signals Sa and Sb after the conversion of the frame format to the scramblers 14a and 14b, respectively.

The scramblers 14a and 14b apply scrambling processes to the data signals Sa and Sb, respectively. The scramblers 14a and 14b output the data signals Sa and Sb after the scrambling processes, respectively, to the cross-connect unit 15.

The cross-connect unit 15 includes input ports P1 and P2 and output ports P3 and P4. The CPU 10 sets the coupling relationship between the input ports P1 and P2 and the output ports P3 and P4. The cross-connect unit 15 is an example of an acquiring unit.

The CPU 10 operates according to a program stored in the memory 11. The CPU 10 communicates with the receiver 2a. The CPU 10 receives the fault information and the repair information from the receiver 2a and sets the coupling relationship between the input ports P1 and P2 and the output ports P3 and P4 in response to the reception of the fault information and the repair information. When the fault information is not received, such as when the optical signal S is transmitted in the active transmission path 9a, the CPU 10 couples the input port P1 to the output port P3 and couples the input port P2 to the output port P4 so that the symbols are not degenerated (see dotted arrows).

The data signal Sa is input to the input port P1 from the scrambler 14a, and the data signal Sb is input to the input port P2 from the scrambler 14b. Therefore, the data signal Sa is output to the multiplexer 16 from the output port P3, and the data signal Sb is output to the multiplexer 16 from the output port P4.

The multiplexer 16 combines, in 2 bits, bit data Da and Db of the data signals Sa and Sb to generate a bit string Ds. For example, the multiplexer 16 produces the bit string Ds from the bit data Da and Db of the data signals Sa and Sb.

The multiplexer 16 is an example of a combining unit, and the bit data Da and Db are examples of first bit data and second bit data. The frame converting units 13a and 13b, the scramblers 14a and 14b, the cross-connect unit 15, and the multiplexer 16 are circuits including hardware, such as field programmable gate array (FPGA) and application specified integrated circuit (ASIC).

For example, the multiplexer 16 allocates the bit data Da of the data signal Sa to the upper side of the bit string Ds and allocates the bit data Db of the data signal Sb to the lower side of the bit string Ds to produce the bit string Ds.

FIG. 6 depicts an example of data values of the bit string Ds produced from the bit data Da and Db. There are four types of values in each of the bit data Da and Db including "00," "01," "10," and "11" in binary notation, and therefore, there are 16 types (=4×4) of data values in the bit string Ds including "0000," "0001," . . . , "1111" in binary notation.

For example, when the bit data Da is "01" and the bit data Db is "10," the data value of the bit string Ds is "0110." When the bit data Da is "00" and the bit data Db is "11," the data value of the bit string Ds is "0011."

In this way, the bit data Da of the data signal Sa is allocated to the upper side of the bit string Ds, and the bit data Db of the data signal Sb is allocated to the lower side of the bit string Ds. As a result, the receiver 2b may easily execute the process of acquiring the bit data Da and Db from the bit string Ds.

With reference again to FIG. 5, the multiplexer 16 outputs the bit string Ds to the transmitting unit 17. The transmitting unit 17 includes a DSP 170, a modulator 171, and a laser diode (LD) 172 and transmits the optical signal S to the transmission paths 9a and 9b according to a digital coherent optical transmission system.

The DSP 170 maps the bit string Ds to the symbol corresponding to the data value of the bit string Ds according to the multi-level modulation system. An example of the multi-level modulation system followed by the DSP 170 to execute the mapping process includes 16-QAM.

FIG. 7 depicts an example of a 16-QAM constellation in which symbols are not degenerated. The DSP 170 maps the bit string Ds to the symbol corresponding to the data value from "0000" to "1111" of the bit string Ds according to the 16-QAM modulation system.

In the example, the data values "0000," "0101," "1010," and "1111" in which the same pattern of 2 bits is repeated correspond to the symbols positioned at the corners of the square area surrounding the symbols among the plurality of symbols arranged in the constellation. Therefore, the symbols of the data values "0000," "0101," "1010," and "1111" are positioned at four corners of the square area, and the distances between the symbols in the constellation are maximum.

With reference again to FIG. 5, the DSP 170 outputs the mapped bit string Ds to the modulator 171. The modulator 171 includes, for example, a digital-to-analog (D/A) conversion circuit, a polarization beam splitter, a polarization beam combiner, and a Mach-Zehnder modulator. The modulator 171 uses the transmission light input from the LD 172 to generate the optical signal S from the bit string Ds according to the digital coherent optical transmission system and transmits the optical signal S to the transmission paths 9a and 9b. The optical signal S is input to the receiver 2b from the transmission paths 9a and 9b.

The receiver 2b includes a receiving unit 27, a demultiplexer 26, descramblers 24a and 24b, frame converting units 23a and 23b, CFPs 22a and 22b, a memory 21, and a CPU 20. The receiving unit 27 includes a DSP 270, a demodulator 271, and an LD 272.

The demodulator 271 includes, for example, an analog-to-digital (A/D) conversion circuit, a photodiode, a 90-degree optical hybrid circuit, and a polarization beam splitter. The demodulator 271 uses local light input from the LD 272 to generate the bit string Ds from the optical signal S according to the digital coherent optical transmission system and outputs the bit string Ds to the DSP 270.

The DSP 270 demaps the symbol to restore the bit string Ds. The demapping process is executed by extracting the data value corresponding to the symbol in the constellation illustrated in FIG. 7. In this way, the receiving unit 27 is an example of a demodulating unit that demodulates the bit string Ds.

The demultiplexer 26 is an example of a separating unit and is configured to separate the bit data Da and Db from the bit string Ds. The demultiplexer 26 outputs the 2 bits on the upper side of the bit string Ds as the bit data Da and outputs the 2 bits on the lower side of the bit string Ds as the bit data Db. The bit data Da is input to the descrambler 24a, and the bit data Db is input to the descrambler 24b.

The descramblers 24a and 24b apply descrambling processes to the bit data Da and Db, respectively, and output the bit data Da and Db to the frame converting units 23a and 23b, respectively. The frame converting units 23a and 23b convert the frame format of the bit data Da and Db from the "OTUk/Cn" to the data signals Sa and Sb of the Ethernet frame, respectively, and output the data signals Sa and Sb to the CFPs 22a and 22b. The CFPs 22a and 22b transmit the data signals Sa and Sb to the routers 8a and 8b, respectively.

The CPU 20 operates according to a program stored in the memory 21. The CPU 20 communicates with the optical switch 4. The CPU 20 acquires, from the optical switch 4, selection information indicating the transmission paths 9a and 9b selected by the optical switch 4 and outputs LF notifications to the CFPs 22a and 22b according to the selection information. Once the LF notifications are input from the CPU 20, the CFPs 22a and 22b transmit the LF signals to the routers 8a and 8b instead of the data signals Sa and Sb.

Figure 8:
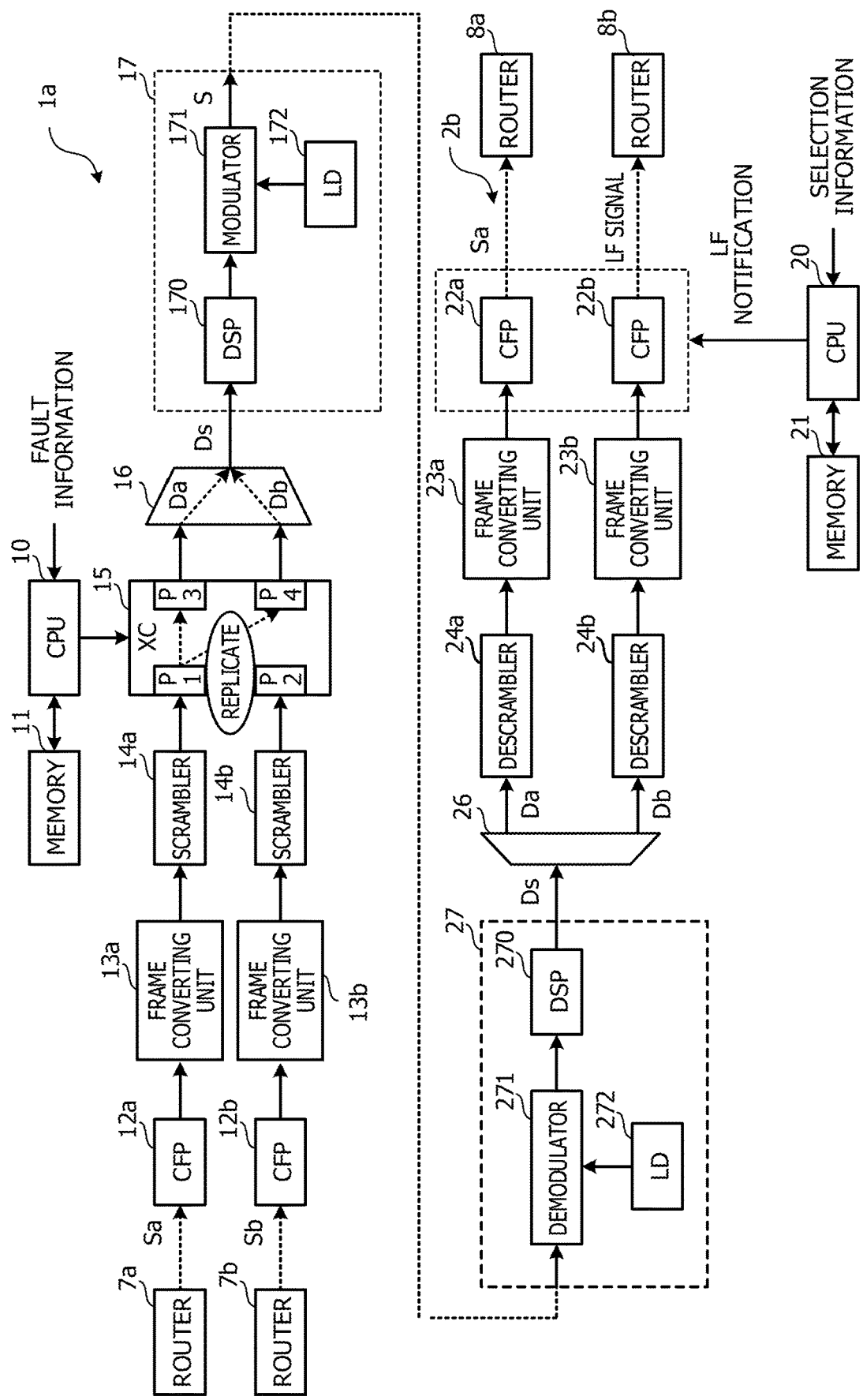
FIG. 8 is a block diagram illustrating an example of a transmitter and a receiver when a degeneration process of symbols is executed.

FIG. 8 is a block diagram illustrating an example of the transmitter 1a and the receiver 2b when the degeneration process of the symbols is executed. In FIG. 8, the same reference signs are provided to the components common to FIG. 5, and the description will not be repeated.

The CPU 10 receives the fault information of the active transmission path 9a from the receiver 2a. In this case, the optical signal S is transmitted in the standby transmission path 9b, and the CPU 10 couples the input port P1 to both of the output ports P3 and P4 (see dotted arrows) to degenerate the symbols. Therefore, the data signal Sa input to the input port P1 is duplicated and output to the multiplexer 16 from each of the output ports P3 and P4.

As a result, the multiplexer 16 combines, in 2 bits, the same bit data Da and Db acquired from the data signal Sa to generate the bit string Ds. The other data signal Sb is discarded at the input port P2.

FIG. 9 depicts an example of data values of the bit string Ds produced from the same bit data Da and Db. For example, the bit string Ds is "0000" when the bit data Da and Db are "00," and the bit string Ds is "1010" when the bit data Da and Db is "10." In this way, the multiplexer 16 combines the same bit data Da and Db to produce the bit string Ds in which the same pattern of 2 bits is repeated.

With reference again to FIG. 8, the DSP 170 maps the bit string Ds to the symbol corresponding to the data value of the bit string Ds. In this case, the data value of the bit string Ds is one of "0000," "0101," "1010," and "1111" in which the same pattern of 2 bits is repeated, and therefore, the symbols are degenerated.

Figure 10:
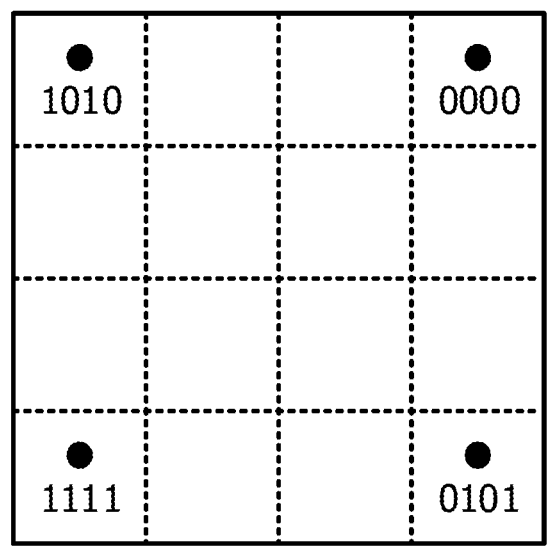
FIG. 10 depicts an example of a 16-QAM constellation in which symbols are degenerated.

FIG. 10 depicts an example of a 16-QAM constellation in which symbols are degenerated. The data values "0000," "0101," "1010," and "1111" correspond to four corners of the square area, such as symbols positioned at corners, and the distances between the symbols are maximum. This reserves the distances sufficient for the receiver 2b to identify the signal point corresponding to each symbol. The positions of the data values "0000," "0101," "1010," and "1111" are not limited to the corners, and the data values may correspond to symbols at other positions as long as the distances between the symbols are longer than usual.

As described, the cross-connect unit 15 acquires the bit data Da and Db from the data signals Sa and Sb, respectively, when the optical signal S is transmitted to the active transmission path 9a. Therefore, the multiplexer 16 produces the bit string Ds from the bit data Da and Db of the two data signals Sa and Sb, and the DSP 170 may map the bit string Ds to 16 types of symbols.

The cross-connect unit 15 acquires the same bit data Da and Db from one data signal Sa when the optical signal S is transmitted to the standby transmission path 9b. Therefore, the multiplexer 16 combines the same bit data Da and Db of one data signal Sa to produce the bit string Ds in which the same pattern is repeated, and the DSP 170 may map the bit string Ds to four types of symbols.

In this way, the symbols of the 16-QAM are degenerated from 16 types to four types when the optical signal S is transmitted to the standby transmission path 9b. Therefore, sufficient distances are reserved between the symbols in the constellation. Even when the transmission distance of the standby transmission path 9b is longer than that of the active transmission path 9a, the receiver 2b may sufficiently identify the signal point corresponding to each symbol and demodulate the data signal Sa.

Therefore, the transmitter 1a and the receiver 2b may improve the OSNR without reducing the degree of multilevel while maintaining the 16-QAM. Thus, the transmitter 1a and the receiver 2b do not have to spend time to change the degree of multi-level, and the time required to switch the transmission path may be reduced.

With reference again to FIG. 8, the CPU 20 acquires the selection information indicating that the optical switch 4 has selected the standby transmission path 9b. Therefore, the CPU 20 outputs the LF notification to the CFP 22b. The CFP 22b outputs the LF signal to the router 8b according to the LF notification. This allows the router 8b to determine that the data signal Sb from the router 7b on the transmitting side is interrupted.

Although the transmitter 1a and the receiver 2b transmit and receive two data signals Sa and Sb in the example, the transmitter 1a and the receiver 2b may also transmit and receive three data signals Sa to Sc.

Figure 11:
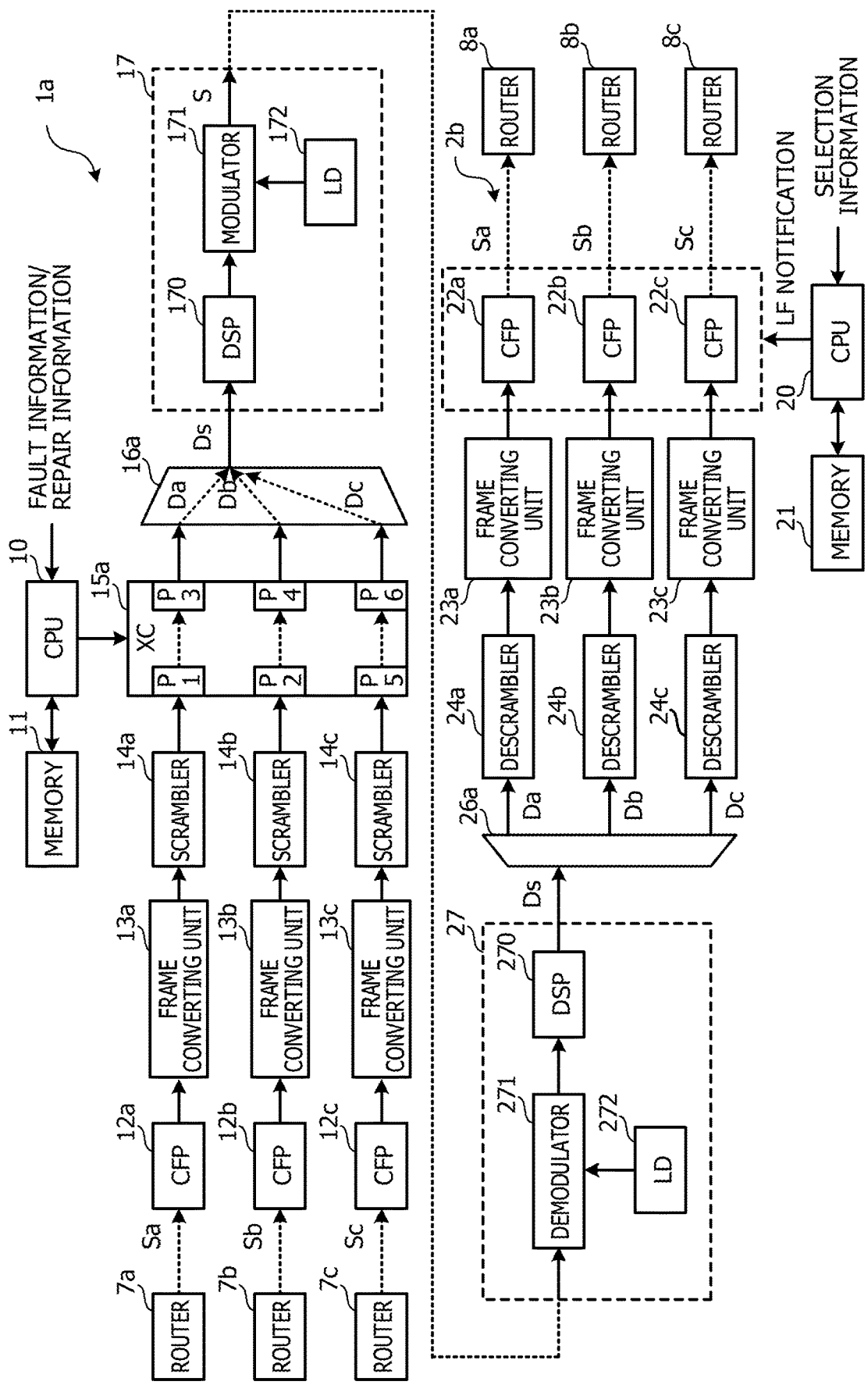
FIG. 11 is a block diagram illustrating another example of a transmitter and a receiver when a degeneration process of symbols is stopped.

FIG. 11 is a block diagram illustrating another example of the transmitter 1a and the receiver 2b when the degeneration process of the symbols is stopped. In FIG. 11, the same reference signs are provided to the components common to FIG. 5, and the description will not be repeated.

The transmitter 1a includes the CPU 10, the memory 11, CFPs 12a to 12c, frame converting units 13a to 13c, scramblers 14a to 14c, a cross-connect unit 15a, a multiplexer 16a, and the transmitting unit 17. The router 7c transmits the data signal Sc to the CFP 12c. The CFP 12c, the frame converting unit 13c, and the scrambler 14c process the data signal Sc in a similar manner to the other CFPs 12a and 12b, frame converting units 13a and 13b, and scramblers 14a and 14b. The data signal Sc is an example of a third data signal.

The cross-connect unit 15a includes input ports P1, P2, and P5 and output ports P3, P4, and P6. The scramblers 14a to 14c input the data signals Sa to Sc to the input ports P1, P2, and P5, respectively.

When the fault information is not received, such as when the optical signal S is transmitted in the active transmission path 9a, the CPU 10 couples the input port P1 to the output port P3, couples the input port P2 to the output port P4, and couples the input P5 to the output port P6 (see dotted arrows) so that the symbols are not degenerated. Therefore, the data signal Sa is output to the multiplexer 16a from the output port P3, the data signal Sb is output to the multiplexer 16a from the output port P4, and the data signal Sc is output to the multiplexer 16a from the output port P6.

The multiplexer 16a combines, in 2 bits, bit data Da to Dc of the data signals Sa to Sc to generate the bit string Ds. For example, the multiplexer 16a produces the bit string Ds from the bit data Da to Dc of the data signals Sa to Sc.

The multiplexer 16a is an example of a combining unit, and the bit data Dc is an example of third bit data. The frame converting unit 13c, the scrambler 14c, the cross-connect unit 15a, and the multiplexer 16a are circuits including hardware, such as FPGA and ASIC.

For example, the multiplexer 16a allocates the bit data Da of the data signal Sa to the upper side of the bit string Ds, allocates the bit data Dc of the data signal Sc to the lower side of the bit string Ds, and allocates the bit data Db of the data signal Sb to between the upper side and the lower side of the string Ds to produce the bit string Ds.

FIG. 12 depicts an example of data values of the bit string Ds produced from the bit data Da to Dc. There are four types of values in each of the bit data Da and Db including "00," "01," "10," and "11" in binary notation, and therefore, there are 64 types (=4×4×4) of data values in the bit string Ds including "000000," "000001," . . . , "111111" in binary notation.

For example, when the bit data Da is "01," the bit data Db is "10," and the bit data Dc is "11," the data value of the bit string Ds is "011011." When the bit data Da is "00," the bit data Db is "11," and the bit data Dc is "01," the data value of the bit string Ds is "001101." Although the number of bits of each of the bit data Da to Dc is two in the example, the number of bits is not limited to this, and the number of bits according to the degree of multi-level of the modulation system may be used.

With reference again to FIG. 11, the multiplexer 16a outputs the bit string Ds to the DSP 170. The DSP 170 is an example of a multi-level modulation system and is configured to map the bit string Ds to the symbol corresponding to the data value of the bit string Ds according to 64-QAM.

FIG. 13 depicts an example of a 64-QAM constellation when symbols are not degenerated. The DSP 170 maps the bit string Ds to the symbol corresponding to the data value from "000000" to "111111" of the bit string Ds according to the 64-QAM modulation system.

In the example, the data values "000000," "010101," "101010," and "111111" in which the same pattern of 2 bits is repeated correspond to the symbols positioned at the corners of the square area surrounding the symbols among the plurality of symbols arranged in the constellation. Therefore, the symbols of the data values "000000," "010101," "101010," and "111111" are positioned at four corners of the square area, and the distances between the symbols in the constellation are maximum.

With reference again to FIG. 11, the receiver 2b includes the receiving unit 27, a demultiplexer 26a, descramblers 24a to 24c, frame converting units 23a to 23c, CFPs 22a to 22c, the memory 21, and the CPU 20.

The DSP 270 demaps the symbol to restore the bit string Ds. The demapping process is executed by extracting the data value corresponding to the symbol in the constellation illustrated in FIG. 13.

The demultiplexer 26a is an example of a separating unit and is configured to separate the bit data Da to Dc from the bit string Ds. The demultiplexer 26a outputs the 2 bits on the upper side of the bit string Ds as the bit data Da, outputs the 2 bits on the lower side of the bit string Ds as the bit data Dc, and outputs the 2 bits between the upper side and the lower side of the bit string Ds as the bit data Db. The bit data Da to Dc are input to the scramblers 24a to 24c, respectively.

The descrambler 24c, the frame converting unit 23c, and the CFP 22c process the data signal Sc in a similar manner to the other descramblers 24a and 24b, frame converting units 23a and 23b, and CFPs 22a and 22b.

The CPU 20 outputs the LF notifications to the CFPs 22a to 22c according to the selection information from the optical switch 4. The CFP 22c transmits the LF signal to the router 8c according to the LF notification from the CPU 20 in a similar manner to the CFPs 22a and 22b.

Figure 14:
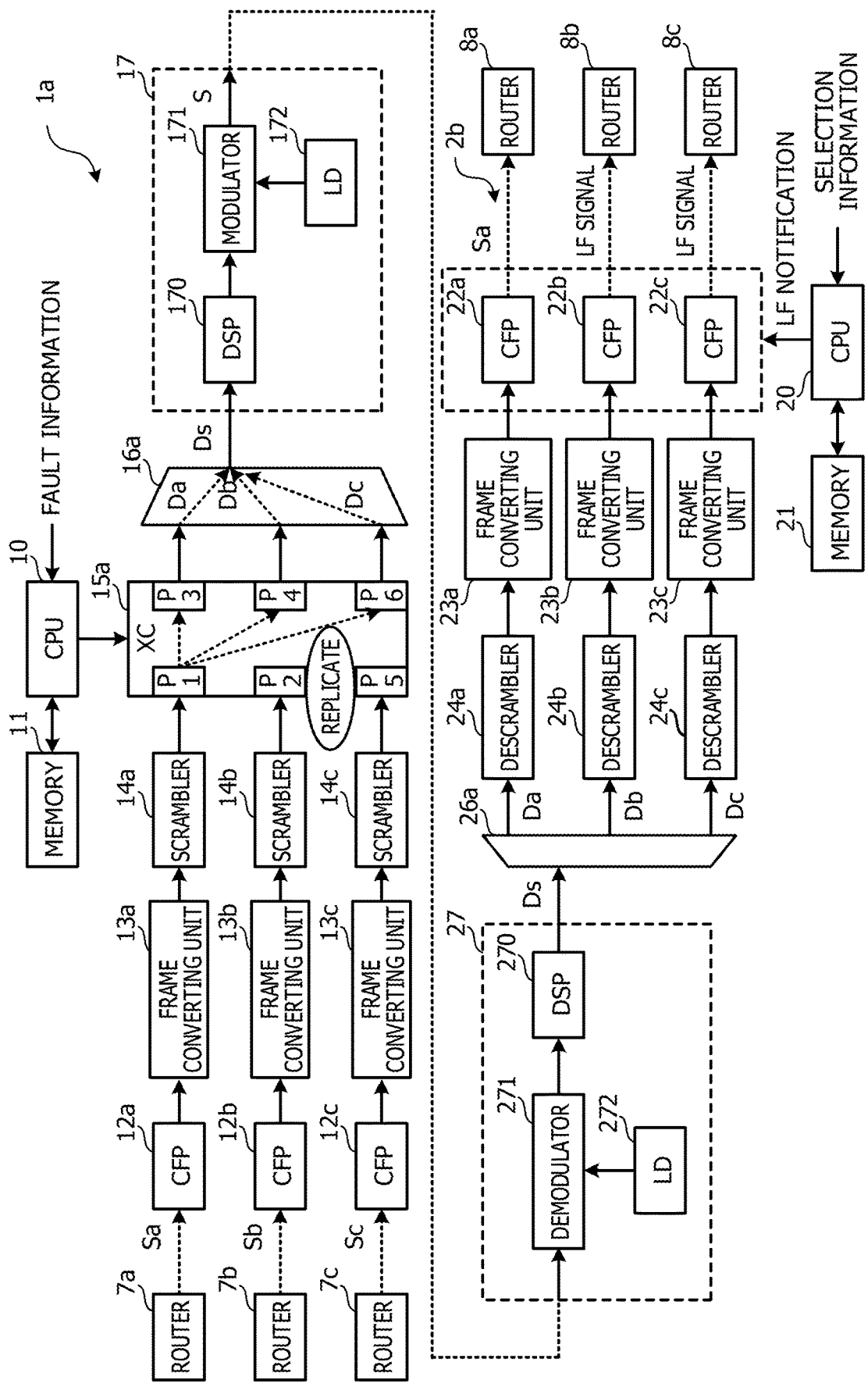
FIG. 14 is a block diagram illustrating another example of a transmitter and a receiver when a degeneration process of symbols is executed.

FIG. 14 is a block diagram illustrating another example of the transmitter 1a and the receiver 2b when the degeneration process of the symbols is executed. In FIG. 14, the same reference signs are provided to the components common to FIG. 11, and the description will not be repeated.

The CPU 10 receives the fault information of the active transmission path 9a from the receiver 2a. In this case, the optical signal S is transmitted in the standby transmission path 9b, and the CPU 10 couples the input port P1 to each of the output ports P3, P4, and P6 (see dotted arrows) to degenerate the symbols. Therefore, the data signal Sa input to the input port P1 is duplicated and output to the multiplexer 16a from each of the output ports P3, P4, and P6.

As a result, the multiplexer 16a combines, in 2 bits, the same bit data Da to Dc acquired from one data signal Sa to generate the bit string Ds. The other data signals Sb and Sc are discarded at the input ports P2 and P5, respectively.

FIG. 15 depicts another example of the data values of the bit string Ds produced from the same bit data Da to Dc. For example, the bit string Ds is "000000" when each of the bit data Da to Dc is "00," and the bit string Ds is "101010" when each of the bit data Da to Dc is "10." In this way, the multiplexer 16 combines the same bit data Da to Dc to produce the bit string Ds in which the same pattern of 2 bits is repeated.

With reference again to FIG. 14, the DSP 170 maps the bit string Ds to the symbol corresponding to the data value of the bit string Ds. In this case, the data value of the bit string Ds is one of the four types of values "000000," "010101," "101010," and "111111" in which the same pattern of 2 bits is repeated, and therefore, the symbols are degenerated.

Figure 16:
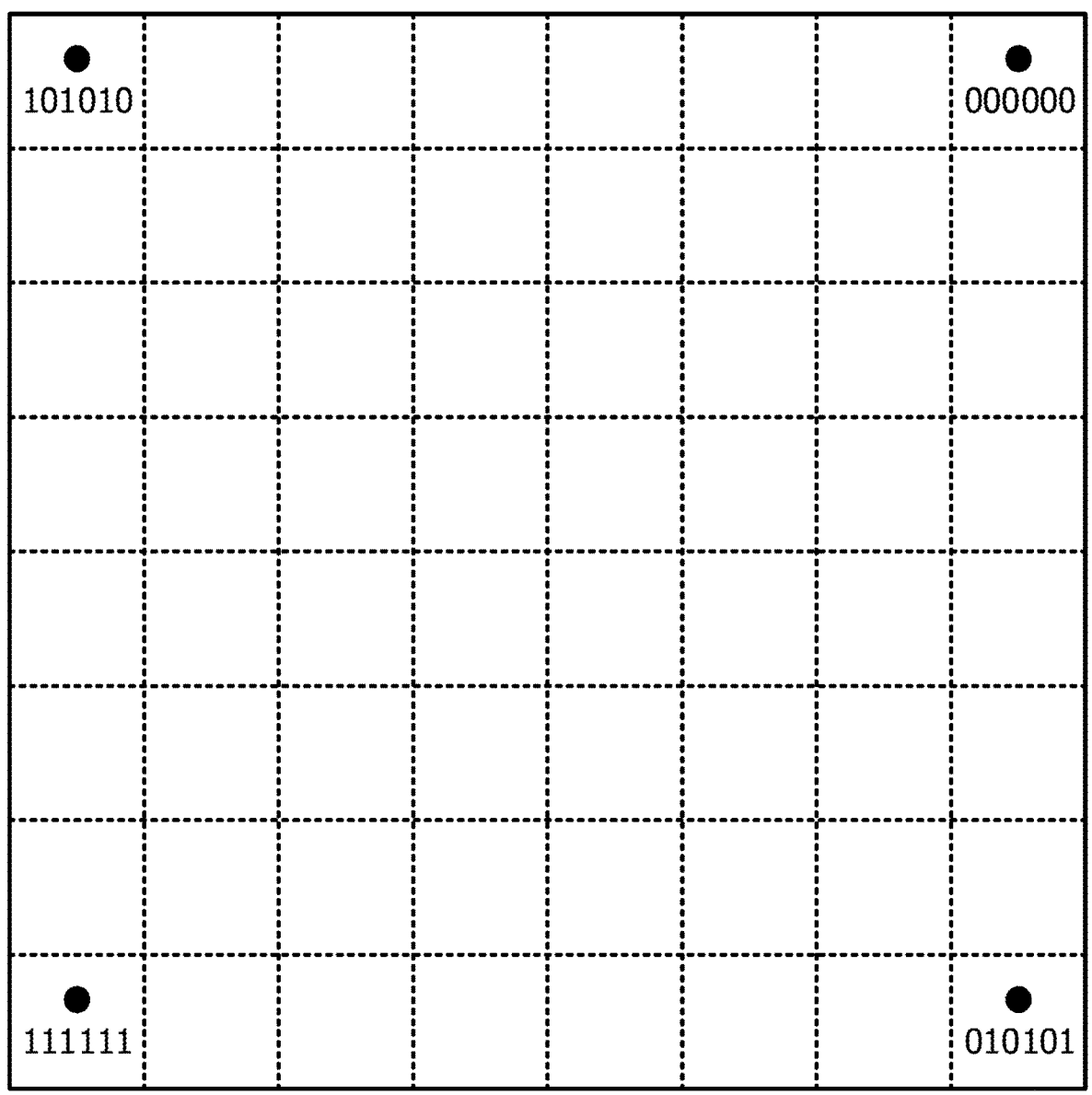
FIG. 16 depicts an example of a 64-QAM constellation in which symbols are degenerated.

FIG. 16 depicts an example of a 64-QAM constellation in which symbols are degenerated. The data values "000000," "010101," "101010," and "111111" correspond to four corners of the square area, such as symbols positioned at the corners, and the distances between the symbols are maximum. This reserves the distances sufficient for the receiver 2b to identify the signal point corresponding to each symbol. The positions of the data values "000000," "010101," "101010," and "111111" are not limited to the corners, and the data values may correspond to symbols at other positions as long as the distances between the symbols are longer than usual.

As described, the cross-connect unit 15a acquires the bit data Da to Dc from the data signals Sa to Sc, respectively, when the optical signal S is transmitted to the active transmission path 9a. Therefore, the multiplexer 16a produces the bit string Ds from the bit data Da to Dc of three data signals Sa to Sc, and the DSP 170 may map the bit string Ds to 64 types of symbols.

The cross-connect unit 15a acquires the same bit data Da to Dc from one data signal Sa when the optical signal S is transmitted to the standby transmission path 9b. Therefore, the multiplexer 16a combines the same bit data Da to Dc of one data signal Sa to produce the bit string Ds in which the same pattern is repeated, and the DSP 170 may map the bit string Ds to four types of symbols.

In this way, the symbols of the 64-QAM are degenerated from 64 types to four types when the optical signal S is transmitted to the standby transmission path 9b. Therefore, sufficient distances are reserved between the symbols in the constellation. Even when the transmission distance of the standby transmission path 9b is longer than that of the active transmission path 9a, the receiver 2b may sufficiently identify the signal point corresponding to each symbol and demodulate the data signal Sa. Therefore, the time required to switch the transmission path may also be reduced when three types of data signals Sa to Sc are input to the transmitter 1a as in the case described above.

With reference again to FIG. 14, the CPU 20 acquires the selection information indicating that the optical switch 4 has selected the standby transmission path 9b. Therefore, the CPU 20 outputs the LF notifications to the CFPs 22b and 22c. The CFPs 22b and 22c output the LF signals to the routers 8b and 8c according to the LF notifications. This allows the routers 8b and 8c to determine that the data signals Sb and Sc from the routers 7b and 7c on the transmitting side are interrupted, respectively.

In the example, although the transmitter 1a produces the bit string Ds only from the data signal Sa when the optical signal S is transmitted to the standby transmission path 9b, the transmitter 1a may produce the bit string Ds from the data signals Sa and Sb.

Figure 17:
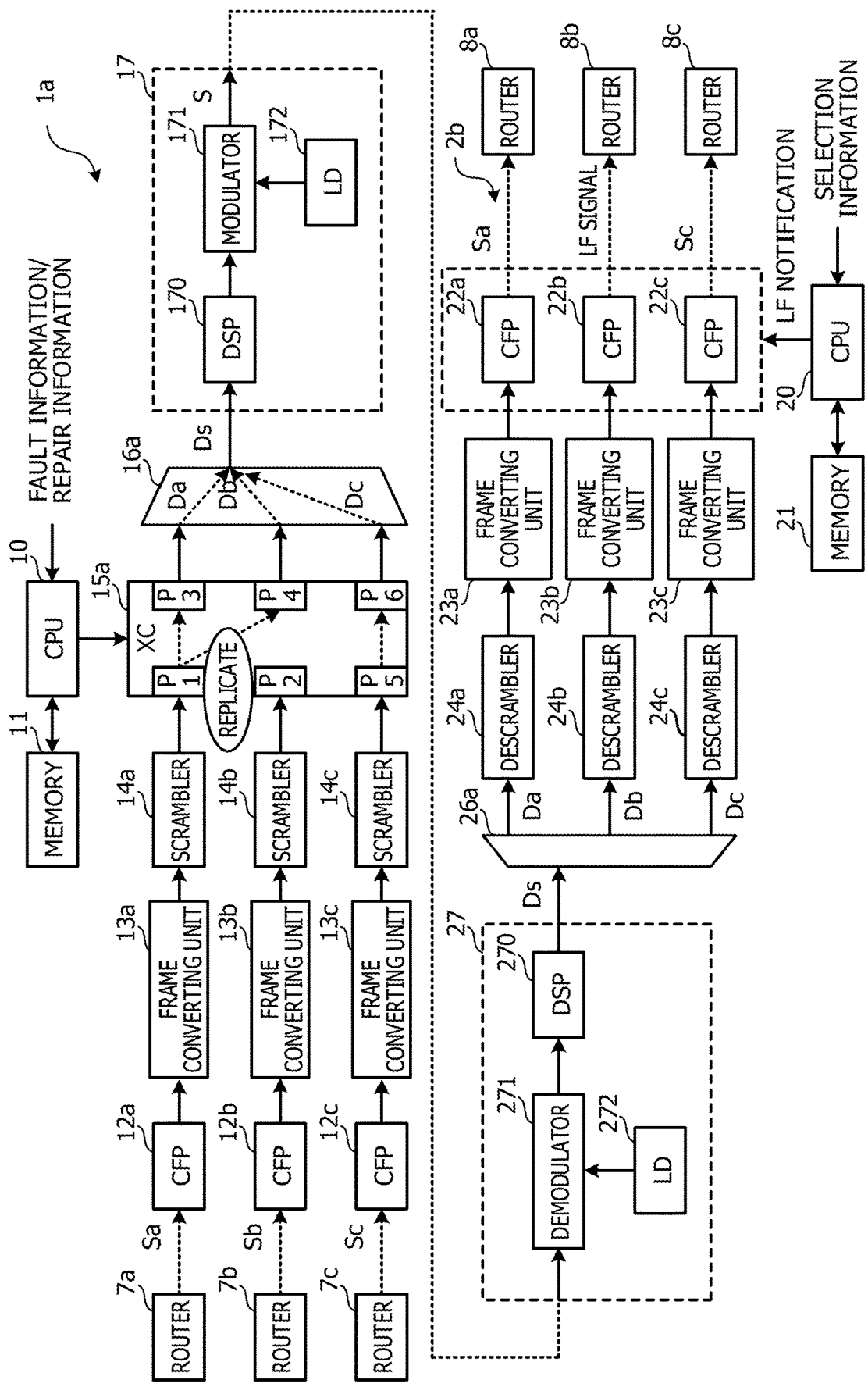
FIG. 17 is a block diagram illustrating another example of a transmitter and a receiver when a degeneration process of symbols is executed.

FIG. 17 is a block diagram illustrating another example of the transmitter 1a and the receiver 2b when the degeneration process of the symbols is executed. In FIG. 17, the same reference signs are provided to the components common to FIG. 11, and the description will not be repeated.

The CPU 10 receives the fault information of the active transmission path 9a from the receiver 2a. In this case, the optical signal S is transmitted in the standby transmission path 9b. Therefore, the CPU 10 couples the input port P1 to each of the output ports P3 and P4 and couples the input port P5 to the output port P6 (see dotted arrows) to degenerate the symbols. Thus, the data signal Sa input to the input port P1 is replicated and output to the multiplexer 16a from each of the output ports P3 and P4. The data signal Sc input to the input port P5 is output to the multiplexer 16a from the output port P6.

As a result, the multiplexer 16a combines, in 2 bits, the same bit data Da and Db acquired from one data signal Sa and the bit data Dc acquired from another data signal Sc to generate the bit string Ds. The remaining data signal Sb is discarded at the input port P2.

FIG. 18 depicts an example of data values of the bit string Ds produced from the same bit data Da and Db acquired from one data signal Sa and the bit data Dc acquired from another data signal Sc. For example, when each of the bit data Da and Db is "00," and the bit data Dc is "01," the bit string Ds is "000001." When each of the bit data Da and Db is "10," and the bit data Dc is "11," the bit string Ds is "101011."

When each of the bit data Da and Db is "11," and the bit data Dc is "11," the bit string Ds is "111111." In this way, the multiplexer 16a combines the same bit data Da and Db acquired from one data signal Sa and the bit data Dc acquired from another data signal Sc to produce the bit string Ds in which the same pattern of 2 bits is repeated in at least 4 bits on the upper side.

With reference again to FIG. 17, the DSP 170 maps the bit string Ds to the symbol corresponding to the data value. In this case, the data value of the bit string Ds is one of 16 types of values "0000," "0101," "1010," and "1111" (** indicates each value from "00" to "11") in which the same pattern of 2 bits is repeated in at least 4 bits on the upper side, and the symbols are degenerated.

FIG. 19 depicts another example of a 64-QAM constellation in which symbols are degenerated. Sixteen symbols corresponding to the data values "0000," "0101," "1010," and "1111" are arranged in the constellation at intervals of one or two symbols in FIG. 13. This reserves distances sufficient for the receiver 2b to identify the signal point corresponding to each symbol.

As described, the cross-connect unit 15a acquires the bit data Da to Dc from the data signals Sa to Sc, respectively, when the optical signal S is transmitted to the active transmission path 9a. The cross-connect unit 15a acquires the same bit data Da and Db from one data signal Sa and acquires the bit data Dc from another data signal Sc when the optical signal S is transmitted to the standby transmission path 9b.

Therefore, the multiplexer 16a combines the same bit data Da and Db of one data signal Sa to produce the bit string Ds in which the same pattern is at least partially repeated, and the DSP 170 may map the bit string Ds to 16 types of symbols.

In this way, the symbols of the 64-QAM are degenerated from 64 types to 16 types when the optical signal S is transmitted to the standby transmission path 9b. In the example, the bit string Ds is produced from the bit data Da and Dc of two types of data signals Sa and Sc among the three types of data signals Sa to Sc, and the intervals in the constellation are narrower than the intervals between the symbols in the constellation illustrated in FIG. 16.

However, distances more sufficient than the intervals between the symbols in the constellation illustrated in FIG. 13 are reserved between the symbols in the constellation. Therefore, the receiver 2b may sufficiently identify the signal point corresponding to each symbol and demodulate the data signals Sa and Sc even when the transmission distance of the standby transmission path 9b is longer than that of the active transmission path 9a. This may also reduce the time required to switch the transmission path in the example as in the case descried above.

In the example, the bit string Ds is produced from the bit data Da and Dc of two types of data signals Sa and Sc. Therefore, the data signal Sc as well as the data signal Sa may be transmitted through the standby transmission path 9b. As a result, the communication between the router 7a and the router 8a and the communication between the router 7c and the router 8c are continued even after the transmission path is switched.

With reference again to FIG. 17, the CPU 20 acquires the selection information indicating that the optical switch 4 has selected the standby transmission path 9b. Therefore, the CPU 20 outputs the LF notification to the CFP 22b. The CFP 22b outputs the LF signal to the router 8b according to the LF notification. This allows the router 8b to determine that the data signal Sb from the router 7b on the transmitting side is interrupted.

The embodiment described above is a preferred embodiment of the present invention. However, the embodiment is not limited to these, and the embodiment may be modified and carried out in various ways without departing from the scope of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission apparatus coupled to an active transmission path and a standby transmission path, the transmission apparatus comprising:
    a memory; and
    a processor coupled to the memory and configured to:
        when the active transmission path is used for transmission, produce a first bit string by combining first bit data and second bit data,
map the first bit string to a symbol corresponding to a data value of the first bit string according to a multi-level modulation system, and
transmit the first bit string to the active transmission path; and
when the a standby transmission path is used for transmission,
duplicate first bit data,
produce a second bit string by combining, in 2 bits, the first bit data and the duplicated first bit data,
map the second bit string to a symbol corresponding to a data value of the second bit string according to the multi-level modulation system, and
transmit the second bit string to the standby transmission path.

2. The transmission apparatus according to claim 1, wherein
the processor allocates the first bit data to an upper side of the second bit string and allocates the duplicated first bit data to a lower side of the second bit string to produce the second bit string.

3. The transmission apparatus according to claim 2, wherein
a data value of the second bit string corresponds to a symbol positioned at a corner of an area surrounding a plurality of symbols arrayed in a constellation among the plurality of symbols.

4. The transmission apparatus according to claim 2, wherein
symbols corresponding to the upper bit string and the lower bit string are mapped to the four corners of the IQ plane, and
the upper bit string and the lower bit string have a same pattern.

5. The transmission apparatus according to claim 1,
when the active transmission path is used for transmission, wherein the processor produces the first bit string by combining the first bit data, the second bit data, and third bit data,
when the standby transmission path is used for transmission, wherein the processor duplicate the first bit data and produce the second bit string by combining, in 2 bits, the first bit data and a plurality of the duplicated first bit data.

6. The transmission apparatus according to claim 5, wherein
a data value of the second bit string produced from first data and the plurality of the duplicated first data corresponds to a symbol positioned at a corner of an area surrounding a plurality of symbols arrayed in a constellation among the plurality of symbols.

7. The transmission apparatus according to claim 1,
when the active transmission path is used for transmission, wherein the processor produces the first bit string by combining the first bit data, the second bit data, and third bit data, and
when the standby transmission path is used for transmission, wherein the processor duplicate the first bit data and produce the second bit string by combining, in 2 bits, the first bit data, the duplicated first bit data, and the third bit data.

8. A transmission system comprising:
a first transmission apparatus and a second transmission apparatus coupled through an active transmission path and a standby transmission path,
when the active transmission path is used for transmission,
wherein the first transmission apparatus
produces a first bit string by combining first bit data and second bit data,
maps the first bit string to a symbol corresponding to a data value of the first bit string according to a multi-level modulation system, and
transmits the first bit string to the active transmission path; and
wherein the second transmission apparatus
demodulates the first bit string, and
separates the first bit data and the second bit data from the demodulated first bit string, and
when the a standby transmission path is used for transmission,
wherein the first transmission apparatus
duplicates first bit data,
produces a second bit string by combining, in 2 bits, the first bit data and the duplicated first bit data,
maps the second bit string to a symbol corresponding to a data value of the second bit string according to the multi-level modulation system, and
transmits the second bit string to the standby transmission path, and
wherein the second transmission apparatus
demodulates the second bit string, and
separates the first bit data from the demodulated second bit string.

9. The transmission system according to claim 8, wherein
the first transmission apparatus allocates the first bit data to an upper side of the second bit string and allocating the duplicated first bit data to a lower side of the second bit string to produce the second bit string,
symbols corresponding to the upper bit string and the lower bit string are mapped to the four corners of the IQ plane, and
the upper bit string and the lower bit string have a same pattern.

10. A transmission method comprising:
when the active transmission path is used for transmission,
producing a first bit string by combining first bit data and second bit data,
mapping the first bit string to a symbol corresponding to a data value of the first bit string according to a multi-level modulation system, and
transmitting the first bit string to the active transmission path; and
when the a standby transmission path is used for transmission,
duplicating first bit data,
producing a second bit string by combining, in 2 bits, the first bit data and the duplicated first bit data,
mapping the second bit string to a symbol corresponding to a data value of the second bit string according to the multi-level modulation system, and
transmitting the second bit string to the standby transmission path.

11. The transmission method according to claim 10, further comprising:
allocating the first bit data to an upper side of the second bit string and allocating the duplicated first bit data to a lower side of the second bit string to produce the second bit string.

12. The transmission method according to claim 11, wherein symbols corresponding to the upper bit string and the lower bit string are mapped to the four corners of the IQ plane, and the upper bit string and the lower bit string have a same pattern.

* * * * *